United States Patent
Feng et al.

(10) Patent No.: US 12,537,637 B2
(45) Date of Patent: Jan. 27, 2026

(54) SERVICE PROCESSING METHOD AND APPARATUS

(71) Applicant: Huawei Technologies Co., Ltd., Shenzhen (CN)

(72) Inventors: Chao Feng, Chengdu (CN); Zhaoming Gong, Dongguan (CN); Yujie Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 484 days.

(21) Appl. No.: 17/974,745

(22) Filed: Oct. 27, 2022

(65) Prior Publication Data

US 2023/0051477 A1 Feb. 16, 2023

Related U.S. Application Data

(63) Continuation of application No. PCT/CN2021/088553, filed on Apr. 21, 2021.

(30) Foreign Application Priority Data

Apr. 28, 2020 (CN) .......................... 202010348997.5

(51) Int. Cl.
 *H04L 5/00* (2006.01)
(52) U.S. Cl.
 CPC ................... *H04L 5/0044* (2013.01)
(58) Field of Classification Search
 CPC ... H04L 5/0044; H04L 45/745; H04L 12/413; H04J 3/1652; H04Q 11/0003; H04Q 11/0062; H04Q 2011/0086
 See application file for complete search history.

(56) References Cited

U.S. PATENT DOCUMENTS

2010/0309930 A1\* 12/2010 Harrison ............... H04L 12/413
 370/474
2011/0182580 A1 7/2011 Yin
(Continued)

FOREIGN PATENT DOCUMENTS

CN 1735239 A \* 2/2006 ............ H04W 28/12
CN 1983888 A 6/2007
(Continued)

OTHER PUBLICATIONS

Q. Li, L. Jiao and F. Y. Li, "Performance Evaluation of the GCR Block ACK Mechanism in IEEE 802.11aa Networks," European Wireless 2013; 19th European Wireless Conference, Guildford, UK, 2013, pp. 1-7 (Year: 2013).\*
(Continued)

*Primary Examiner* — Ayaz R Sheikh
*Assistant Examiner* — Louis Samara
(74) *Attorney, Agent, or Firm* — Slater Matsil, LLP

(57) ABSTRACT

This application provides a service processing method and apparatus. The method includes: A transmitting device generates a plurality of transmission frames, where an $i^{th}$ frame in the plurality of transmission frames carries first information, the first information is used to indicate an amount of data of a service that is carried in each of t transmission frames, the t transmission frames include an $(i-t)^{th}$ frame to an $(i-1)^{th}$ frame in the plurality of transmission frames, i−t>0, and t≥1; and sends the plurality of transmission frames to a receiving device. A transmission frame carries information about an amount of data of the service that is carried in a transmission frame before the transmission frame.

20 Claims, 7 Drawing Sheets

(56) References Cited

U.S. PATENT DOCUMENTS

| | | | |
|---|---|---|---|
| 2016/0056886 A1* | 2/2016 | Kitamura | H04Q 11/0005 398/19 |
| 2016/0261339 A1* | 9/2016 | Kitamura | H04Q 11/0005 |
| 2018/0013509 A1 | 1/2018 | Meyer et al. | |
| 2018/0159785 A1* | 6/2018 | Wu | H04J 3/1658 |

FOREIGN PATENT DOCUMENTS

| | | | | |
|---|---|---|---|---|
| CN | 102196321 A | | 9/2011 | |
| CN | 102201974 A | * | 9/2011 | H04J 3/1652 |
| CN | 106411454 A | * | 2/2017 | H04J 3/1658 |
| CN | 107408997 A | | 11/2017 | |
| CN | 106535230 B | * | 7/2019 | H04W 84/18 |
| CN | 111177160 A | * | 5/2020 | G06F 16/2379 |
| EP | 4016931 A1 | * | 6/2022 | H04L 47/20 |
| JP | 2002208930 A | | 7/2002 | |
| JP | 5903154 B2 | * | 4/2016 | H04B 10/032 |
| KR | 20080100753 A | * | 11/2008 | H04W 72/30 |
| WO | 9907100 A1 | | 2/1999 | |
| WO | 2011135726 A1 | | 11/2011 | |
| WO | 2014029253 A1 | | 2/2014 | |
| WO | WO-2017016379 A1 | * | 2/2017 | H04J 3/07 |
| WO | 2019153253 A1 | | 8/2019 | |

OTHER PUBLICATIONS

ITU-T G.709/Y.1331,Series G: Transmission Systems and Media,Digital Systems and Networks, Series Y:Global Information Infrastructure,Internet Protocol Aspects,Next-Generation Networks,Internet of Things and Smart Cities,Mar. 2019,total 11 pages.

* cited by examiner

Information #A: used to indicate an amount of data (for example, a payload length) of a service that is carried in an $(i-t)^{th}$ transmission frame to an $(i-1)^{th}$ transmission frame Information #B: used to indicate a sequence number of an $(i-)^{th}$ transmission frame

SERVICE PROCESSING METHOD AND APPARATUS

CROSS-REFERENCE TO RELATED APPLICATIONS

This application is a continuation of International Patent Application No. PCT/CN2021/088553, filed on Apr. 21, 2021, which claims priority to Chinese Patent Application 202010348997.5, filed on Apr. 28, 2020. The disclosures of the aforementioned applications are hereby incorporated by reference in their entireties.

TECHNICAL FIELD

This application relates to the field of optical communication, and more specifically, to a service processing method and apparatus.

BACKGROUND

Currently, according to a known technology, a transmitting device maps a service (or a data stream of a service) to a plurality of transmission frames, and a receiving device determines a transmission rate of the service based on an amount of data of the service that is carried in a transmission frame received in a unit time, and then determines clock information of the service based on the transmission rate, so that the service can be recovered from the received transmission frame.

However, in a case such as frame loss, the receiving device cannot accurately determine the clock information, and therefore cannot recover the service from the received transmission frame, thereby reducing communication performance.

SUMMARY

This application provides a service processing method and apparatus, so that when some of transmission frames sent by a transmitting device are lost, a receiving device can still reliably recover a service from a received transmission frame, thereby improving communication performance.

According to a first aspect, a service processing method is provided, including: A transmitting device generates a plurality of transmission frames, where an $i^{th}$ frame in the plurality of transmission frames carries first information, the first information is used to indicate an amount of data of a service that is carried in each of t transmission frames, the t transmission frames include an $(i-t)^{th}$ frame to an $(i-1)^{th}$ frame in the plurality of transmission frames, $i-t>0$, and $t \geq 1$; and sends the plurality of transmission frames to a receiving device.

t is a positive integer, i is a positive integer, and $i-t>0$. It should be noted that when $t=1$, "an $(i-t)^{th}$ transmission frame to an $(i-1)^{th}$ transmission frame" may be understood as "an $(i-1)^{th}$ transmission frame".

According to the solution provided in this application, the transmission frame carries the first information. When a transmission frame is lost, the receiving device can determine, based on the first information, an amount of data of the service that is carried in the lost transmission frame, and then can determine a transmission amount of the service, so that clock information of the service can be determined. Therefore, even if a transmission frame is lost, the receiving device can still recover the service from a received transmission frame without retransmitting the part of service, thereby reducing a communication delay and improving communication performance.

Optionally, the service includes a constant bit rate (CBR) service. That is, because clock information of the CBR service may be determined based on a transmission rate of the CBR service, the service processing method provided in this application can be effectively applied to transmission of the CBR service. It should be understood that the foregoing enumerated specific type of the service is merely an example for description, and this application is not limited thereto. The solution of this application can be applied to transmission processes of various services in which clock information is determined based on a transmission rate.

Optionally, the transmission frame includes a flexible optical service unit (OSUflex) frame. That is, because a size of a payload part of the OSUflex frame (or an amount of data of a service that is carried in the OSUflex frame) is not fixed, a receiving device cannot estimate an amount of data of the service that is carried in a lost OSUflex frame. Therefore, the service processing method provided in this application can be effectively applied to a case in which the OSUflex frame is used to carry a service.

It should be understood that the foregoing enumerated specific type of the transmission frame is merely an example for description, and this application is not limited thereto. The solution of this application can be applied to transmission processes based on various transmission frames whose payload parts do not have a fixed length. Alternatively, the solution of this application can be applied to transmission processes based on various transmission frames (for example, an ODUk frame) whose payload parts have a fixed length.

Optionally, the first information includes t pieces of sub-information, the t pieces of sub-information are in a one-to-one correspondence with the t transmission frames, and each of the t pieces of sub-information is used to indicate an amount of data of the service that is carried in a corresponding transmission frame.

Specifically, when a value of t is greater than 1, each of the $(i-t)^{th}$ frame to the $(i-1)^{th}$ frame may correspond to independent sub-information, that is, the amount of data of the service that is carried in each of the $(i-t)^{th}$ frame to the $(i-1)^{th}$ frame may be independently indicated, so that the receiving device can determine, based on the first information carried in the $i^{th}$ frame, the amount of data of the service that is carried in each of the $(i-t)^{th}$ frame to the $(i-1)^{th}$ frame.

It should be noted that, in this application, the plurality of transmission frames may be represented by sequence numbers, and the sequence numbers may start from 0. That is, when $i-t=1$, the $(i-t)^{th}$ frame may be a transmission frame 0 in the plurality of transmission frames. Alternatively, the sequence numbers may start from 1. That is, when $i-t=1$, the $(i-t)^{th}$ frame may be a transmission frame 1 in the plurality of transmission frames.

It should be understood that the foregoing enumerated specific form of the first information is merely an example for description, and this application is not limited thereto. For example, the first information may alternatively indicate a sum of amounts of data of the service that is carried in the $(i-t)^{th}$ frame to the $(i-1)^{th}$ frame.

Alternatively, the first information may alternatively indicate an amount of data (denoted as a first data amount) of the service that is carried in one of the $(i-t)^{th}$ frame to the $(i-1)^{th}$ frame, and a deviation value between an amount of data of the service that is carried in another frame of the $(i-t)^{th}$ frame to the $(i-1)^{th}$ frame and the first data amount.

Alternatively, the first information may alternatively indicate a deviation value between the amount of data of the service that is carried in each of the $(i-t)^{th}$ frame to the $(i-1)^{th}$ frame and a predefined reference data amount. In addition, in this case, the reference data amount may be specified by a communication system or a communication protocol. Alternatively, the reference data amount may be determined by negotiation between the transmitting device and the receiving device.

Optionally, the amount of data of the service that is carried in the transmission frame is a first value or a second value, the first information includes t bits, the t bits are in a one-to-one correspondence with the t transmission frames, and a value of each of the t bits corresponds to an amount of data of the service that is carried in a corresponding transmission frame.

Optionally, the method further includes: The transmitting device determines, based on a first mapping relationship, an identifier corresponding to each of the t transmission frames (specifically, a value of the amount of data of the service that is carried in each transmission frame). The first mapping relationship is used to indicate a one-to-one correspondence between k values and k identifiers (for example, bit sequences, bit sets, bit groups, or bit strings), and the k values include a value of an amount of data of the service that is carried in each of the plurality of transmission frames. The transmitting device determines the first information based on the identifier corresponding to each of the t transmission frames.

Optionally, the first mapping relationship may be specified by a communication system or a communication protocol. Alternatively, the first mapping relationship may be determined by negotiation between the transmitting device and the receiving device.

Optionally, the k values correspond to the service. That is, for different services, possible values of amounts of data of the services that is carried in the transmission frame may be different. For example, an amount of data of a service that is carried in the transmission frame may include two possible values: a preset maximum value or minimum value. In addition, maximum values corresponding to different services may be different. Alternatively, minimum values corresponding to different services may be different.

Optionally, the first information is carried in an overhead part (or an overhead area) of the transmission frame.

It should be understood that the foregoing enumerated position of the first information in the transmission frame is merely an example for description, and this application is not limited thereto. For example, the first information may alternatively be located in a payload part (or a payload area) of the transmission frame.

Optionally, the value of t is determined based on a bit error rate of a transmission channel between the transmitting device and the receiving device.

Optionally, the method further includes: The transmitting device receives feedback information from the receiving device. The feedback information is used to determine the bit error rate of the transmission channel between the transmitting device and the receiving device.

For example, a larger bit error rate may indicate a larger value of t.

Optionally, t is equal to 1, 2, or 3.

Optionally, the $i^{th}$ frame carries second information, and the second information is used to indicate a sequence number of the $i^{th}$ frame in the plurality of transmission frames. Therefore, the receiving device may determine, based on second information carried in a received transmission frame, whether a transmission frame is lost. Optionally, the second information is carried in the overhead part (or the overhead area) of the transmission frame.

It should be understood that the foregoing enumerated position of the second information in the transmission frame is merely an example for description, and this application is not limited thereto. For example, the second information may alternatively be located in the payload part (or the payload area) of the transmission frame.

Optionally, the first information is further used to indicate an amount of data of the service that is carried in the $i^{th}$ frame.

Optionally, the $i^{th}$ frame carries third information, and the third information is used to indicate an amount of data of the service that is carried in the $i^{th}$ frame.

In this application, the third information and the first information may be same information, or may be different information. This is not particularly limited in this application.

Therefore, the receiving device can quickly determine, based on the third information, the amount of data of the service that is carried in the $i^{th}$ frame, thereby facilitating a process of determining clock information of the service.

Optionally, the third information is carried in the overhead part (or the overhead area) of the transmission frame.

It should be understood that the foregoing enumerated position of the third information in the transmission frame is merely an example for description, and this application is not limited thereto. For example, the third information may alternatively be located in the payload part (or the payload area) of the transmission frame.

According to a second aspect, a service processing method is provided, including: A receiving device receives at least one transmission frame. The at least one transmission frame belongs to a plurality of transmission frames that carry a service and that are sent by a transmitting device, an $i^{th}$ frame in the plurality of transmission frames carries first information, the first information is used to indicate an amount of data of the service that is carried in each of t transmission frames, the t transmission frames include an $(i-t)^{th}$ frame to an $(i-1)^{th}$ frame in the plurality of transmission frames, $i-t>0$, and $t \geq 1$. The receiving device determines, based on the first information, clock information of the service carried in the at least one transmission frame.

For example, when the $i^{th}$ frame is a transmission frame received by the receiving device in a first time period, that the receiving device determines, based on the first information, clock information of the service carried in the at least one transmission frame includes: When a transmission frame is lost in the first time period, the receiving device determines, based on first information carried in a first transmission frame, a transmission rate of the service sent by the transmitting device in the first time period. The receiving device determines, based on the transmission rate, clock information of the service carried in the transmission frame received in the first time period.

Specifically, the receiving device may determine, based on the first information carried in the transmission frame received in the first time period, an amount of data of the service that is carried in a lost transmission frame in transmission frames sent by the transmitting device in the first time period (denoted as an amount of lost data), and then can determine, based on an amount of data of the service that is carried in the transmission frame received in the first time period and the lost amount of data, a total amount of data sent by the transmitting device in the first time period, and then determine, based on the total amount of data and a duration of the first time period, a transmission rate of the service transmitted in the first time period.

Then, the receiving device may determine, based on the transmission rate, clock information of the service transmitted in the first time period.

For example, the receiving device may determine clock information (or a clock frequency) based on a bit width and the transmission rate.

The bit width may be understood as an amount of data processed at a time when the receiving device obtains service data from a transmission frame.

Assuming that the clock information is $\alpha$, the bit width is $\beta$, and the transmission rate is $\gamma$, $\alpha=\gamma/\beta$.

Optionally, the service includes a constant bit rate service.

Optionally, the transmission frame includes a flexible optical service unit frame.

Optionally, the first information includes t pieces of sub-information, the t pieces of sub-information are in a one-to-one correspondence with the t transmission frames, and each of the t pieces of sub-information is used to indicate an amount of data of the service that is carried in a corresponding transmission frame.

Alternatively, the first information may alternatively indicate an amount of data (denoted as a first data amount) of the service that is carried in one of the $(i-t)^{th}$ frame to the $(i-1)^{th}$ frame, and a deviation value between an amount of data of the service that is carried in another frame of the $(i-t)^{th}$ frame to the $(i-1)^{th}$ frame and the first data amount.

Alternatively, the first information may alternatively indicate a deviation value between the amount of data of the service that is carried in each of the $(i-t)^{th}$ frame to the $(i-1)^{th}$ frame and a predefined reference data amount.

Optionally, the amount of data of the service that is carried in the transmission frame is a first value or a second value, the first information includes t bits, the t bits are in a one-to-one correspondence with the t transmission frames, and a value of each of the t bits corresponds to an amount of data of the service that is carried in a corresponding transmission frame.

Optionally, the method further includes: The receiving device determines, based on a first mapping relationship, an identifier corresponding to each of the t transmission frames, and determines a value of the amount of data of the service that is carried in the transmission frame. The first mapping relationship is used to indicate a one-to-one correspondence between k values and k identifiers (for example, bit sequences, bit sets, bit groups, or bit strings), and the k values include a value of an amount of data of the service that is carried in each of the plurality of transmission frames.

Optionally, the k values correspond to the service.

Optionally, the first information is carried in an overhead part (or an overhead area) of the transmission frame.

Optionally, a value of t is determined based on a bit error rate of a transmission channel between the transmitting device and the receiving device.

Optionally, the method further includes: The transmitting device receives feedback information from the receiving device. The feedback information is used to determine the bit error rate of the transmission channel between the transmitting device and the receiving device.

Optionally, t is equal to 1, 2, or 3.

Optionally, the $i^{th}$ frame carries second information, and the second information is used to indicate a sequence number of the $i^{th}$ frame in the plurality of transmission frames.

Optionally, the second information is carried in the overhead part (or the overhead area) of the transmission frame.

Optionally, the first information is further used to indicate an amount of data of the service that is carried in the $i^{th}$ frame.

Optionally, the $i^{th}$ frame carries third information, and the third information is used to indicate an amount of data of the service that is carried in the $i^{th}$ frame.

Optionally, the third information is carried in the overhead part (or the overhead area) of the transmission frame.

According to a third aspect, a service processing method is provided, including: A transmitting device generates a plurality of transmission frames, where an $i^{th}$ frame in the plurality of transmission frames carries sequence number information, the sequence number information is used to indicate a sequence number of the $i^{th}$ frame in the plurality of transmission frames, $i \in [1, M]$, and M is a quantity of the plurality of transmission frames; and sends the plurality of transmission frames to a receiving device.

Therefore, the receiving device may determine, based on sequence number information carried in a received transmission frame, whether a transmission frame is lost.

Optionally, the sequence number information is carried in an overhead part (or an overhead area) of the transmission frame.

It should be understood that the foregoing enumerated position of the sequence number information in the transmission frame is merely an example for description, and this application is not limited thereto. For example, the sequence number information may alternatively be located in a payload part (or a payload area) of the transmission frame.

According to a fourth aspect, a service processing method is provided, including: A receiving device receives at least one transmission frame. The at least one transmission frame belongs to a plurality of transmission frames that carry a service and that are sent by a transmitting device, an $i^{th}$ frame in the plurality of transmission frames carries sequence number information, the sequence number information is used to indicate a sequence number of the $i^{th}$ frame in the plurality of transmission frames, $i \in [1, M]$, M is a quantity of the plurality of transmission frames, and M>1. The receiving device determines, based on the sequence number information, whether a sent transmission frame is lost.

Optionally, the sequence number information is carried in an overhead part (or an overhead area) of the transmission frame.

According to a fifth aspect, a service processing apparatus is provided, including: a processing unit, configured to generate a plurality of transmission frames, where an $i^{th}$ frame in the plurality of transmission frames carries first information, the first information is used to indicate an amount of data of a service that is carried in each of t transmission frames, the t transmission frames include an $(i-t)^{th}$ frame to an $(i-1)^{th}$ frame in the plurality of transmission frames, $i-t>0$, and $t \geq 1$; and a transceiver unit, configured to send the plurality of transmission frames to a receiving device.

Optionally, the first information includes t pieces of sub-information, the t pieces of sub-information are in a one-to-one correspondence with the t transmission frames, and each of the t pieces of sub-information is used to indicate an amount of data of the service that is carried in a corresponding transmission frame.

Optionally, the amount of data of the service that is carried in the transmission frame is a first value or a second value, the first information includes t bits, the t bits are in a one-to-one correspondence with the t transmission frames, and a value of each of the t bits corresponds to an amount of data of the service that is carried in a corresponding transmission frame.

Optionally, the $i^{th}$ frame carries second information, and the second information is used to indicate a sequence number of the $i^{th}$ frame in the plurality of transmission frames.

Optionally, the $i^{th}$ frame carries third information, and the third information is used to indicate an amount of data of the service that is carried in the $i^{th}$ frame.

According to a sixth aspect, a service processing apparatus is provided, including: a transceiver unit, configured to receive at least one transmission frame, where the at least one transmission frame belongs to a plurality of transmission frames that carry a service and that are sent by a transmitting end device, an $i^{th}$ frame in the plurality of transmission frames carries first information, the first information is used to indicate an amount of data of the service that is carried in each of t transmission frames, the t transmission frames include an $(i-t)^{th}$ frame to an $(i-1)^{th}$ frame in the plurality of transmission frames, i−t>0, and t≥1, and a processing unit, configured to determine, based on the first information, clock information of the service carried in the at least one transmission frame.

Optionally, the $i^{th}$ frame is a transmission frame received by the transceiver unit in a first time unit, and the processing unit is specifically configured to: when a transmission frame is lost in the first time unit, determine, based on first information carried in a first transmission frame, a transmission rate of the service sent by the transmitting device in the first time unit; and determine, based on the transmission rate, clock information of the service carried in the transmission frame received in the first time unit.

Optionally, the first information includes t pieces of sub-information, the t pieces of sub-information are in a one-to-one correspondence with the t transmission frames, and each of the t pieces of sub-information is used to indicate an amount of data of the service that is carried in a corresponding transmission frame.

Optionally, the amount of data of the service that is carried in the transmission frame is a first value or a second value, the first information includes t bits, the t bits are in a one-to-one correspondence with the t transmission frames, and a value of each of the t bits corresponds to an amount of data of the service that is carried in a corresponding transmission frame.

Optionally, the $i^{th}$ frame carries second information, and the second information is used to indicate a sequence number of the $i^{th}$ frame in the plurality of transmission frames.

Optionally, the $i^{th}$ frame carries third information, and the third information is used to indicate an amount of data of the service that is carried in the $i^{th}$ frame.

According to a seventh aspect, a service processing apparatus is provided, including: a processing unit, configured to generate a plurality of transmission frames, where an $i^{th}$ frame in the plurality of transmission frames carries sequence number information, the sequence number information is used to indicate a sequence number of the $i^{th}$ frame in the plurality of transmission frames, i∈[1, M], and M is a quantity of the plurality of transmission frames; and a sending unit, configured to send the plurality of transmission frames to a receiving device. Therefore, the receiving device may determine, based on sequence number information carried in a received transmission frame, whether a transmission frame is lost.

Optionally, the sequence number information is carried in an overhead part (or an overhead area) of the transmission frame.

It should be understood that the foregoing enumerated position of the sequence number information in the transmission frame is merely an example for description, and this application is not limited thereto. For example, the sequence number information may alternatively be located in a payload part (or a payload area) of the transmission frame.

According to an eighth aspect, a service processing apparatus is provided, including: a transceiver unit, configured to receive at least one transmission frame, where the at least one transmission frame belongs to a plurality of transmission frames that carry a service and that are sent by a transmitting device, an it frame in the plurality of transmission frames carries sequence number information, the sequence number information is used to indicate a sequence number of the $i^{th}$ frame in the plurality of transmission frames, i∈[1, M], and M is a quantity of the plurality of transmission frames; and a processing unit, configured to determine, based on the sequence number information, whether a sent transmission frame is lost.

Optionally, the sequence number information is carried in an overhead part (or an overhead area) of the transmission frame.

According to a ninth aspect, a communication apparatus is provided, including modules or units configured to perform the method in any one of the first aspect to the fourth aspect and the possible implementations of the first aspect to the fourth aspect.

According to a tenth aspect, a communication device is provided, including a processor. The processor is coupled to a memory, and may be configured to perform the method in any one of the first aspect to the fourth aspect and the possible implementations of the first aspect to the fourth aspect. Optionally, the communication device further includes the memory. Optionally, the communication device further includes a communication interface, and the processor is coupled to the communication interface.

In an implementation, the communication device is an OTN device. In this case, the communication interface may be a transceiver, or an input/output interface. In another implementation, the communication device is a chip or a chip system. In this case, the communication interface may be an input/output interface, an interface circuit, an output circuit, an input circuit, a pin, a related circuit, or the like on the chip or the chip system. The processor may be embodied as a processing circuit or a logic circuit.

According to an eleventh aspect, a communication apparatus is provided, including an input circuit, an output circuit, and a processing circuit. The processing circuit is configured to receive a signal by using the input circuit, and transmit a signal by using the output circuit, so that the method in any one of the first aspect to the fourth aspect and the possible implementations of the first aspect to the fourth aspect is implemented.

In a specific implementation process, the communication apparatus may be a chip, the input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments. Specific implementations of the processor and various circuits are not limited in this embodiment of this application.

According to a twelfth aspect, a processing apparatus is provided, including a processor and a memory. The processor is configured to read instructions stored in the memory, receive a signal by using a receiver, and transmit a signal by using a transmitter, to perform the method in any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

During specific implementation, the memory may be a non-transitory memory, such as a read-only memory (ROM). The memory and the processor may be integrated on one chip, or may be separately disposed on different chips. A type of the memory and a manner of disposing the memory and the processor are not limited in this embodiment of this application.

It should be understood that for related data exchange processes, for example, sending indication information may be a process of outputting indication information from the processor, and receiving capability information may be a process of receiving input capability information by the processor. Specifically, data output by the processor may be output to the transmitter, and input data received by the processor may come from the receiver. The transmitter and the receiver may be collectively referred to as a transceiver.

The processor in the twelfth aspect may be a chip. The processor may be implemented by hardware, or may be implemented by software. When implemented by hardware, the processor may be a logic circuit, an integrated circuit, or the like. When implemented by software, the processor may be a general purpose processor, and is implemented by reading software code stored in the memory. The memory may be integrated into the processor, or may be located outside the processor, and exist independently.

According to a thirteenth aspect, a processing apparatus is provided, including a communication interface and a processing circuit. The communication interface is configured to send a transmission frame according to the method in any one of the first aspect or the third aspect and the possible implementations of the first aspect or the third aspect, and the processing circuit is configured to generate the transmission frame.

According to a fourteenth aspect, a processing apparatus is provided, including a communication interface and a processing circuit. The communication interface is configured to obtain a to-be-processed transmission frame, and the processing circuit is configured to process the to-be-processed transmission frame according to the method in any one of the second aspect or the fourth aspect and the possible implementations of the second aspect or the fourth aspect.

According to a fifteenth aspect, a computer program product is provided. The computer program product includes a computer program (which may also be referred to as code or instructions), and when the computer program is run, a computer is enabled to perform the method in any one of the first aspect to the fourth aspect and the possible implementations of the aspects.

According to a sixteenth aspect, a computer-readable medium is provided. The computer-readable medium stores a computer program (which may also be referred to as code or instructions), and when the computer program is run on a computer, the computer is enabled to perform the method in any one of the first aspect to the fourth aspect and the possible implementations of the aspects.

According to a seventeenth aspect, a communication system is provided, including the transmitting device and the receiving device.

DETAILED DESCRIPTION OF ILLUSTRATIVE EMBODIMENTS

Technical solutions in embodiments of this application may be applied to various communication systems or optical networks in which data can be transmitted by using light.

The optical networks in this application may include but are not limited to an optical transport network (OTN). The OTN is usually formed by connecting a plurality of devices by using an optical fiber, and linear, ring, mesh, and other different topology types may be formed based on specific requirements. For example, an OTN 100 shown in FIG. 1 includes eight OTN devices 101: devices A to H. 102 represents an optical fiber, configured to connect two devices. 103 represents a client service interface, configured to receive or send client service data. One OTN device may have different functions based on actual requirements. Generally, the OTN devices are classified into an optical layer device, an electrical layer device, and a photoelectric hybrid device. The optical layer device is a device that can process an optical layer signal, for example, an optical amplifier (OA) or an optical add-drop multiplexer (OADM). The OA may also be referred to as an optical line amplifier (OLA), mainly configured to amplify an optical signal, to support transmission over a longer distance on the premise of ensuring specific performance of the optical signal. The OADM is configured to perform spatial transformation on an optical signal, so that the optical signal may be output from different output ports (sometimes referred to as directions). The electrical layer device is a device that can process an electrical layer signal, for example, a device that can process an OTN signal. The photoelectric hybrid device is a device that can process an optical layer signal and an electrical layer signal. It should be noted that, based on a specific integration requirement, one OTN device may integrate a plurality of different functions. The technical solutions provided in this application are applicable to OTN devices with an electrical layer function that have different forms and integration levels.

Figure 1:
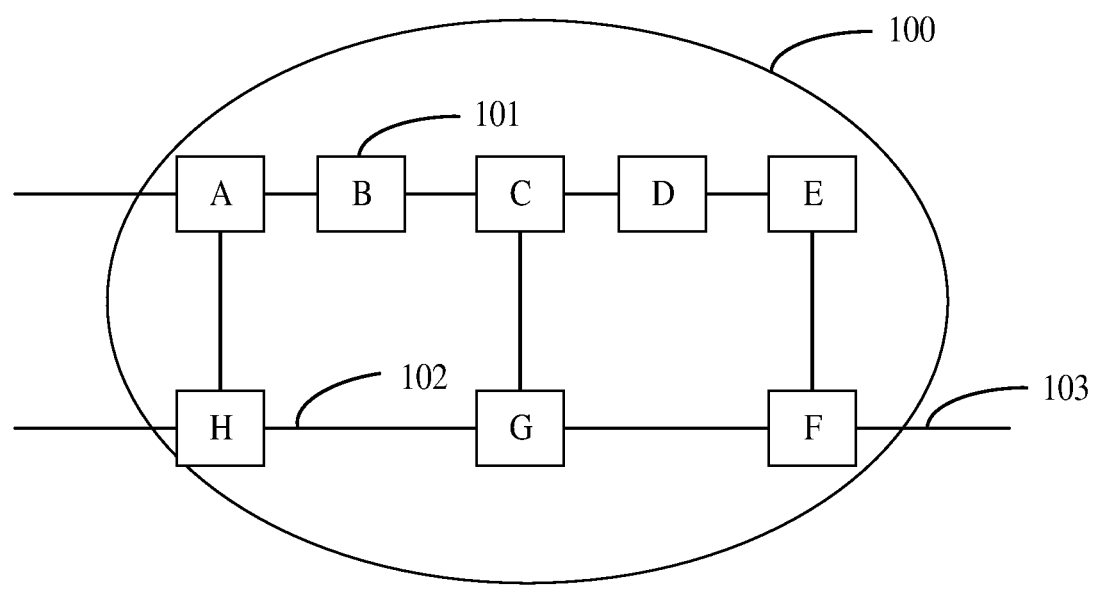
FIG. 1 is a schematic diagram of an example of a communication system according to this application.
Figure 2:
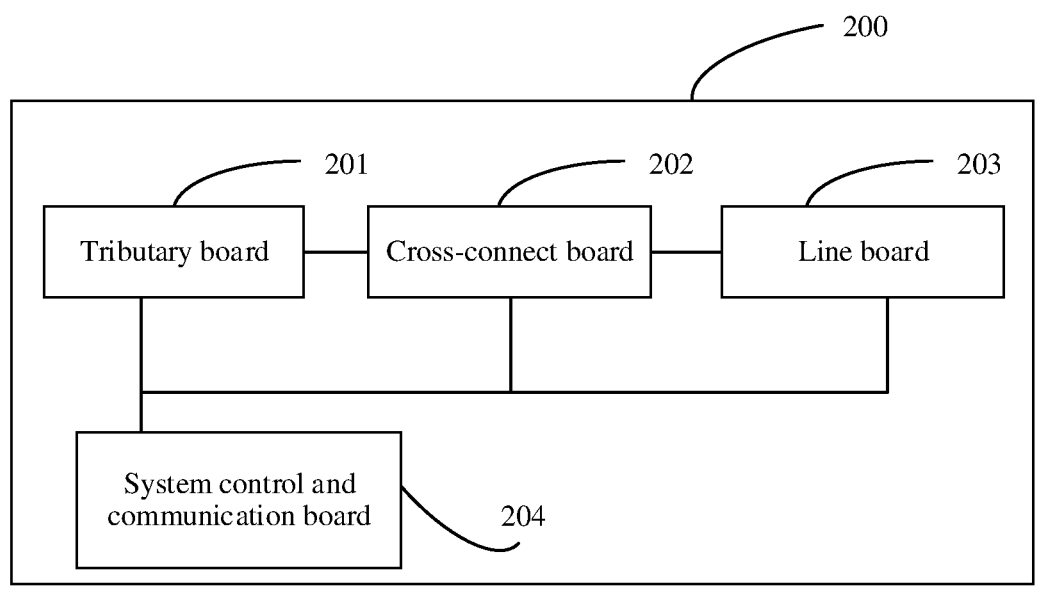
FIG. 2 is a schematic diagram of an example of a communication device according to this application.

FIG. 2 is a schematic diagram of a hardware structure of a possible communication device (that is, a transmitting device or a receiving device in this application), for example, the device A in FIG. 1. Specifically, an OTN device 200 includes a tributary board 201, a cross-connect board 202, a line board 203, an optical layer processing board (not shown in the figure), and a system control and communication board 204. Based on specific requirements, types and quantities of boards included in one communication device may be different. For example, the communication device serving as a core node does not have the tributary board 201. For another example, the communication device serving as an edge node has a plurality of tributary boards 201, or no cross-connect board 202. For another example, the communication device that supports only an electrical layer function may not have the optical layer processing board.

The tributary board 201, the cross-connect board 202, and the line board 203 are configured to process an electrical layer signal of the OTN. The tributary board 201 is configured to receive and send various client services, for example, an SDH service, a packet service, an Ethernet service, and a forward service. Further, the tributary board 201 may be divided into a client-side optical module and a signal processor. The client-side optical module may be an optical transceiver, configured to receive and/or send service data. The signal processor is configured to implement mapping from service data to a data frame and demapping processing. The cross-connect board 202 is configured to exchange data frames, to complete exchange of one or more types of data frames. The line board 203 mainly processes a line-side data frame. Specifically, the line board 203 may be divided into a line-side optical module and a signal processor. The line-side optical module may be a line-side optical transceiver, configured to receive and/or send a data frame. The signal processor is configured to implement multiplexing and demultiplexing or mapping and demapping processing on the line-side data frame. The system control and communication board 204 is configured to implement system control. Specifically, by using a backplane, information may be collected from different boards, or control instructions may be sent to corresponding boards. It should be noted that, unless otherwise specified, there may be one or more specific components (for example, the signal processor). This is not limited in this application. It should be further noted that, types of the boards included in the device and functional designs and quantities of the boards are not limited in this application. It should be noted that, in a specific implementation, two of the boards may alternatively be designed as one board. In addition, the communication device may further include a power supply for backup, a fan for heat dissipation, and the like.

Figure 3:
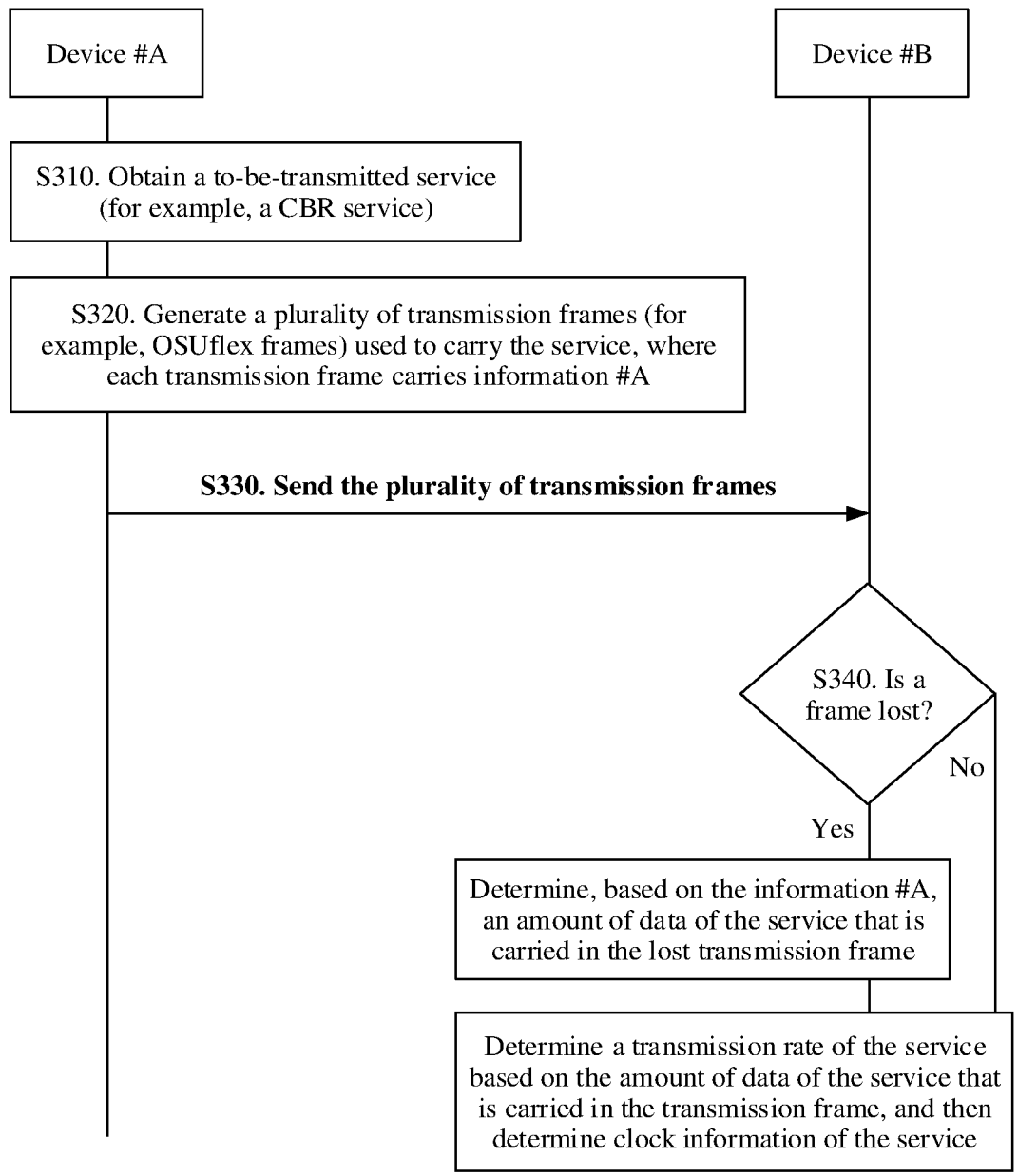
FIG. 3 is a schematic interaction diagram of an example of a service processing method according to this application.

FIG. 3 is a schematic interaction diagram of an example of a service processing method according to this application. As shown in FIG. 3, in S310, a device #A (that is, an example of a transmitting device) obtains a to-be-sent service, or a service data stream or a service signal.

In this application, an independent clock signal is not required in a transmission process of the service. That is, a receiving device may determine clock information (or a clock signal) of the service based on a bandwidth (or a rate, that is, an amount of data transmitted in a unit time) of the service, and then implement clock recovery of the service.

For example rather than limitation, the service may include, but is not limited to, a constant bit rate (CBR) service. The CBR service is encoded at a constant bit rate. For example rather than limitation, the CBR service may include but is not limited to a multimedia streaming service, for example, a video streaming service, a virtual reality (VR) service, or an augmented reality service.

In S320, the device #A generates a plurality of transmission frames carrying the service.

On one hand, when generating the plurality of transmission frames, the device #A maps a data stream of the service to the plurality of transmission frames, specifically, payload parts or payload areas in the transmission frames. On the other hand, when generating the plurality of transmission frames, the device #A adds, to each transmission frame, information (that is, an example of first information, referred to as information #A below for ease of understanding) about an amount of data of the service that is carried in each of t transmission frames before the transmission frame.

The following separately describes the foregoing processes in detail.

1. Mapping Process

The device #A may map the data stream of the service to the plurality of transmission frames (or data frames, transmission signals, or service signals).

In this application, a period of the transmission frame may be a fixed frame period, and a transmission frame used as the fixed frame period may be, for example, an OTN frame.

The OTN frame is used to carry various service data and provide various management and monitoring functions. The OTN frame may be an ODUk, an ODUCn, an ODUflex, an optical transport unit k (OTUk), an OTUCn, a flexible OTN (FlexO) frame, or the like. A difference between an ODU frame and an OTU frame lies in that the OTU frame includes an ODU frame and an OTU overhead. k represents different rate levels. For example, k=1 indicates 2.5 Gbps, and k=4 indicates 100 Gbps. Cn represents a variable rate, specifically, a rate of a positive integer multiple of 100 Gbps. Unless otherwise specified, the ODU frame is any one of the ODUk, the ODUCn, or the ODUflex, and the OTU frame is any one of the OTUk, the OTUCn, or the FlexO. It should be further noted that with development of OTN technologies, an OTN frame of a new type may be defined, and this application is also applicable thereto.

Alternatively, in this application, the period of the transmission frame may be a non-fixed frame period, and a transmission frame used as the non-fixed frame period may be, for example, a flexible optical service unit (OSUflex) frame.

The following describes in detail mapping processes in the foregoing two manners.

Manner 1: The device #A may use, for example, a generic mapping procedure (GMP), an asynchronous mapping procedure (AMP), or a bit-synchronous mapping procedure (BMP), to complete a process of mapping from the service data stream to the transmission frames with a fixed period.

For example, if the GMP is used, the device #A uniformly configures a stuff byte in the service data stream (or client signal) by using a sigma/delta algorithm, so that the service data stream matches a rate of the transmission frame (for example, an ODUk frame).

Manner 2: A period of an OSUflex frame is a non-fixed frame period, and the period of the OSUflex frame is related to a rate (or bandwidth) of a carried service data stream. Therefore, the device #A may provide a variable rate of the OSUflex frame based on a rate of the service data stream, so that a service data stream of any bandwidth may be mapped into an OSUflex frame.

The OSUflex frame is a container generated by using a local clock (that is, a local clock of the device #A), and a rate of the OSUflex frame may be expressed as the following formula:

$$N \times OSUflex\_MBU \text{ kbit/s } (\pm 20 \text{ ppm})$$

OSUflex_MBU represents a minimum bandwidth granularity of the OSUflex frame.

For example, a value of OSUflex_MBU may include but is not limited to 2.4 Mbps. In this case, the OSUflex frame may provide a container with a bandwidth of N×2.4 Mbps.

It should be noted that, a bandwidth of payload of an OSUflex frame used to carry a service data stream (for example, a CBR signal) needs to be greater than a bandwidth of the service data stream. However, if N is excessively large, a mapping delay is increased, and mapping efficiency is reduced. Therefore, in this application, a value of N is calculated based on the following formula:

$$OSUflex\_MBU\_payload\_nom\_bitrate =$$
$$OSUflex\_MBU \times \frac{Number\_of\_bit\_in\_OSUflex\_payload}{Number\_of\_bit\_in\_OSUflex}$$

$$N \geq \text{ceiling}\left(\frac{CBR\_client\_nom\_bitrate}{OSUflex\_MBU\_payload\_nom\_bitrate} \times \frac{1 + CBR\_client\_bitrate\_tolerance}{1 - OSUflex\_bitrate\_tolerance}\right)$$

OSUflex_MBU_payload_nom_bitrate represents a minimum bandwidth granularity of payload of the OSUflex frame.

Number_of_bit_in_OSUflex_payload represents a quantity of bits included in payload (a payload field) of the OSUflex frame.

Number_of_bit_in_OSUflex represents a total quantity of bits included in the OSUflex frame.

The function ceiling( ) means rounding up.

CBR_client_nom_bitrate represents a bandwidth of a CBR client signal (that is, an example of the service data stream).

CBR_client_bitrate_tolerance represents a frequency offset tolerance of the CBR client signal.

OSUfex_bitrate_tolerance represents a frequency offset tolerance of the OSUflex frame.

For ease of understanding, a size of an amount of data carried in the OSUflex frame (or a length of data, or a length of payload carrying data) is denoted as PL_LEN. A value of PL_LEN may correspondingly include two possible values:
- a minimum value, denoted as PL_LEN_MIN, corresponding to a parameter $C_{n,min}$ in the GMP, and
- a maximum value, denoted as PL_LEN_MAX, corresponding to a parameter $C_{n,max}$ in the GMP.

Values of PL_LEN_MIN and PL_LEN_MAX are shown in the following formulas:

$$OSUflex\_payload\_nom\_bits = N \times OSUflex\_MBU\_payload\_nom\_bitrate$$

$$PL\_LEN_{nom} = \left(\frac{CBR\_client\_nom\_bitrate}{OSUflex\_payload\_nom\_bitrate} \times Number\_of\_bytes\_in\_OSUflex\_payload\right)$$

$$PL\_LEN\_MIN = \text{floor}\left(PL\_LEN_{nom} \times \frac{1 - CBR\_client\_bitrate\_tolerance}{1 + OSUflex\_bitrate\_tolerance}\right)$$

$$PL\_LEN\_MIN = \text{ceiling}\left(PL\_LEN_{nom} \times \frac{1 + CBR\_client\_bitrate\_tolerance}{1 - OSUflex\_bitrate\_tolerance}\right)$$

OSUflex_payload_nom_bitrate represents a bandwidth of the data (for example, a CBR signal) carried in the OSUflex frame.

Number_of_bytes_in_OSUflex_payload represents a byte length corresponding to the payload length of the OUSflex.

The function floor( ) means rounding down.

In addition, it should be noted that, in this application, values of PL_LEN_MIN of different services (for example, different CBR services) may be different. Similarly, values of PL_LEN_MAX of different services may be different.

It should be understood that the foregoing enumerated manners of mapping the service data stream to the transmission frames are merely examples for description, and this application is not limited thereto. A person skilled in the art may complete the foregoing mapping process in any manner.

2. Process of Adding the Information #A

In this application, a process of adding data amount indication information to each of the plurality of transmission frames is similar. For ease of understanding, a processing process for a transmission frame #A in the plurality of transmission frames (an $i^{th}$ transmission frame in the plurality of transmission frames) is used as an example for detailed description.

Information #A carried in the transmission frame #A is used to indicate an amount of data of the service that is carried in each of an $(i-t)^{th}$ transmission frame to an $(i-1)^{th}$ transmission frame (that is, t transmission frames before the transmission frame #A) in the plurality of transmission frames, for example, a quantity of bits included in the service carried in a payload area of the transmission frame.

t is a positive integer, i is a positive integer, and i−t>0. It should be noted that when t=1, "an $(i-t)^{th}$ transmission frame to an $(i-1)^{th}$ transmission frame" may be understood as "an $(i-1)^{th}$ transmission frame".

For example rather than limitation, the information #A may indicate, in a bit mapping manner, the amount of data carried in each of the t transmission frames before the transmission frame #A.

Specifically, the information #A may include t pieces of sub-information, and each sub-information may include one or more bits.

In addition, the t pieces of sub-information are in a one-to-one correspondence with the t transmission frames (from the $(i-t)^{th}$ transmission frame to the $(i-1)^{th}$ transmission frame).

Each piece of sub-information (specifically, an arrangement manner or a combination manner of the bits in the sub-information) corresponds to an amount of data carried in a transmission frame corresponding to the sub-information. For example, assuming that sub-information #B in the t pieces of sub-information corresponds to a transmission frame #B in the t transmission frames, a value of a bit in the sub-information #B corresponds to an amount of data carried in the transmission frame #B.

For example, in this application, a mapping relationship #1 (that is, an example of a first mapping relationship) may be stored in the transmitting device and the receiving device. The mapping relationship #1 indicates a correspondence between a plurality of bit sequences and a plurality of values. For example rather than limitation, the mapping relationship #1 may be determined by negotiation between the transmitting device and the receiving device. Alternatively, the mapping relationship #1 may be specified by a communication system or a communication protocol. This is not specifically limited in this application, provided that it is ensured that mapping relationships stored in the transmitting device and the receiving device are consistent.

Therefore, the device #A may select, based on the mapping relationship #1, a bit sequence corresponding to a value of the amount of data carried in the transmission frame #B, as the sub-information #B.

For example, when an OSUflex frame is used as a transmission frame, as described above, a value of PL_LEN of each OSUflex frame may correspondingly include two possible values: PL_LEN_MIN and PL_LEN_MAX.

In this case, PL_LEN_MIN and PL_LEN_MAX may correspond to different bits. For example, PL_LEN_MIN corresponds to "1", and PL_LEN_MAX corresponds to "o".

The following Table 1 shows an example of the mapping relationship #1.

TABLE 1

| Bit | Value of PL_LEN |
|---|---|
| 1 | PL_LEN_MIN |
| 0 | PL_LEN_MAX |

It should be noted that values of PL_LEN_MIN of different services (for example, different CBR services) may be different, and values of PL_LEN_MAX of different services may be different.

It should be understood that the mapping relationship shown in Table 1 is merely an example for description, and this application is not limited thereto. For example, PL_LEN may alternatively include a plurality of possible values. In this case, the plurality of values of PL_LEN may be indicated by increasing a quantity of bits of the sub-information.

It should be understood that the foregoing enumerated indication manner of the information #A is merely an example for description, and this application is not limited thereto. For example, the information #A may alternatively indicate a sum of amounts of data of the service that is carried in the t transmission frames.

For another example, a piece of sub-information (for example, the sub-information #B) in the information #A may be used to indicate an amount of data (denoted as a data amount #B) of the service that is carried in a transmission frame (for example, the transmission frame #B) corresponding to the sub-information, and another piece of sub-information in the information #A may be used to indicate a deviation between an amount of data of the service that is carried in a transmission frame corresponding to the sub-information and the data amount #B.

For another example, each piece of sub-information in the information #A may be used to indicate a deviation between an amount of data of the service that is carried in a transmission frame corresponding to the sub-information and a preset reference data amount.

Figure 4:
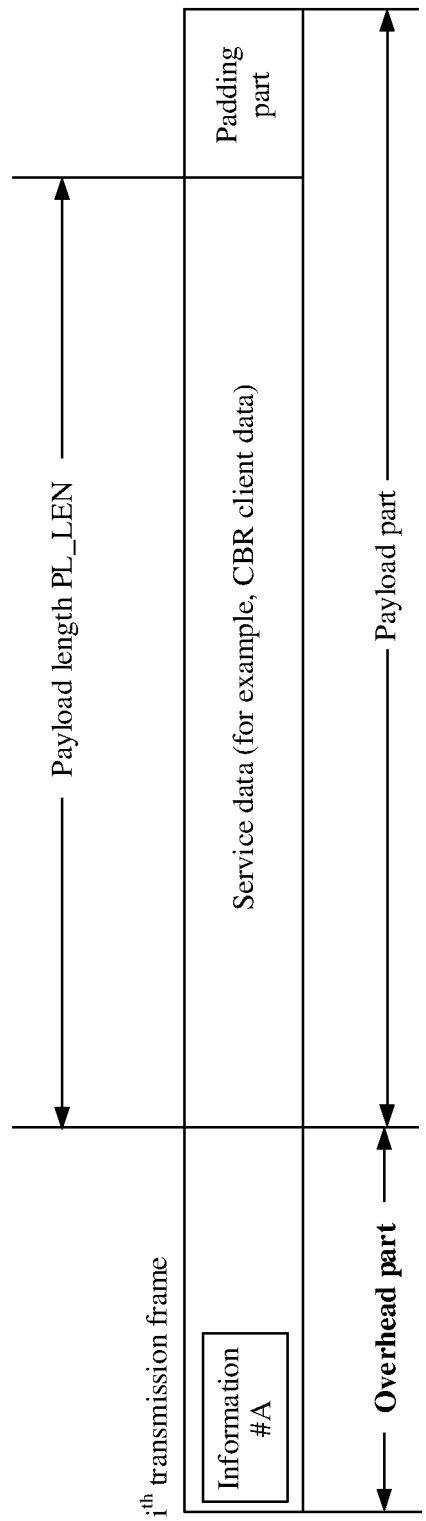
FIG. 4 is a schematic diagram of an example of a transmission frame according to this application.

FIG. 4 shows an example of a transmission frame according to this application. As shown in FIG. 4, in this application, the transmission frame #A includes a payload part (or a payload area) and an overhead part (or an overhead area). The payload part of the transmission frame #A is used to carry data of the service. The overhead part of the transmission frame #A carries the information #A. Therefore, the receiving device may obtain the information #A without parsing the payload part.

It should be understood that the foregoing enumerated structure of the transmission frame #A is merely an example for description, and this application is not limited thereto. The information #A may alternatively be carried in the payload part of the transmission frame #A.

Figure 5:
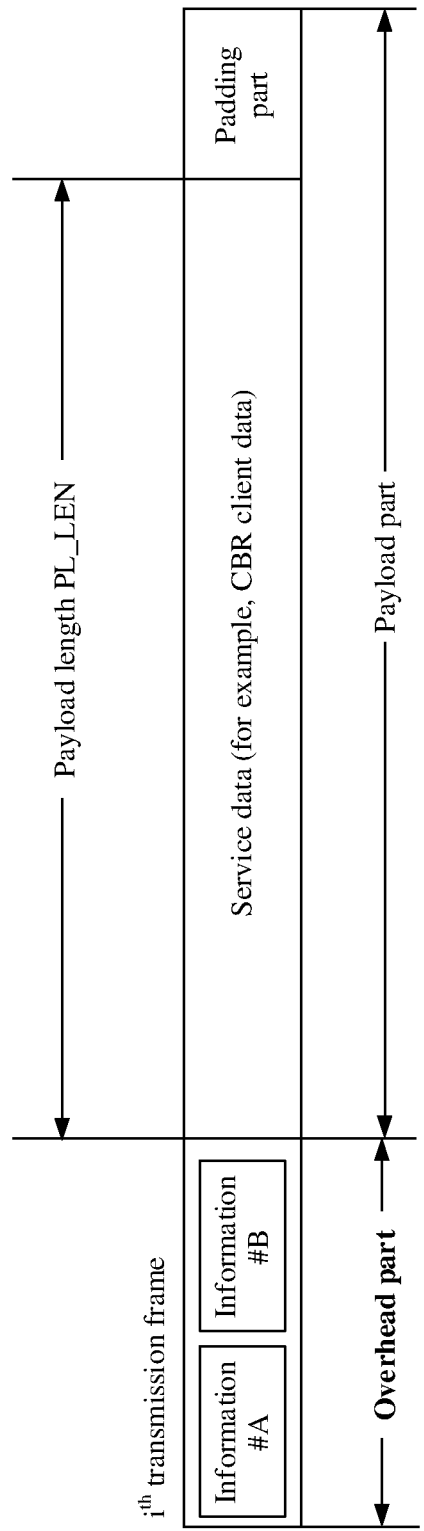
FIG. 5 is a schematic diagram of another example of a transmission frame according to this application.

FIG. 5 shows another example of a transmission frame according to this application. As shown in FIG. 5, the transmission frame #A further carries information #B (that is, an example of second information), to indicate a sequence number of the transmission frame #A in the plurality of transmission frames formed by service mapping. In a specific implementation, the overhead part of the transmission frame #A carries the information #B. Therefore, the receiving device may obtain the information #B without parsing the payload part.

It should be understood that the foregoing enumerated structure of the transmission frame #A is merely an example for description, and this application is not limited thereto. The information #B may alternatively be carried in the payload part of the transmission frame #A.

Figure 6:
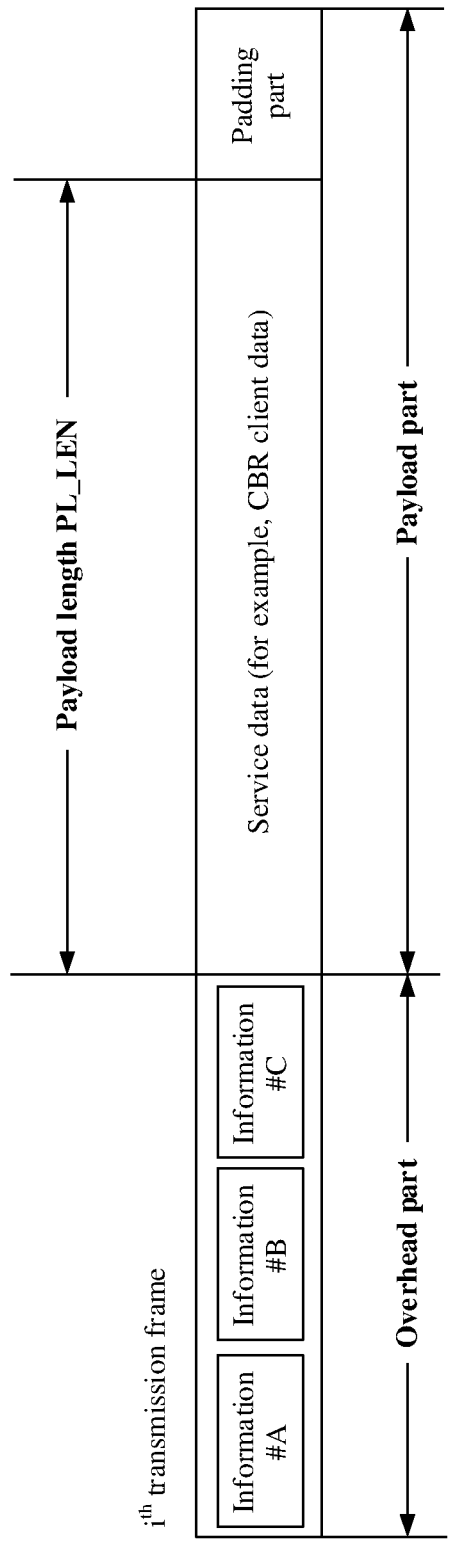
FIG. 6 is a schematic diagram of still another example of a transmission frame according to this application.

FIG. 6 shows another example of a transmission frame according to this application. As shown in FIG. 6, in this application, the transmission frame #A may further carry information #C (that is, an example of third information). The information #C is used to indicate an amount of data of the service that is carried in the transmission frame #A (specifically, the payload part of the transmission frame #A).

It should be noted that the information #C and the information #A may alternatively be same information (for example, a bit occupied by the information #C and a bit occupied by the information #A are consecutive), that is, the information may indicate an amount of data of the service that is carried in each transmission frame from the $(i-t)^{th}$ frame to the $i^{th}$ frame. Alternatively, the information #C and the information #A may be independent of each other. For example, the bit occupied by the information #C and the bit occupied by the information #A are separated by other information or another bit.

A structure of each of the plurality of transmission frames generated in S320 may be similar to the structure of the transmission frame #A. To avoid repetition, detailed descriptions thereof are omitted herein. It should be noted that because some of the plurality of transmission frames (for example, the first transmission frame) generated by the transmitting device does not have t transmission frames before, the transmission frame may include a field (or a bit, which is denoted as a first field for ease of understanding) used to carry the information #A, but the first field may not carry the information #A.

For example, when the first field does not carry the information #A, a bit carried in the field may be blank or a specified special value (for example, a padding bit). Therefore, when the receiving device determines that the bit carried in the first field of the transmission frame is blank or the padding bit, information carried in the first field does not need to be parsed, and the information carried in the first field is considered meaningless. The padding bit may be pre-agreed by the transmitting and the receiving or specified by a system. This is not specifically limited in this application.

In S330, the device #A may send the plurality of generated transmission frames to a device #B (that is, an example of the receiving device).

Due to interference or a fault in a transmission process, the device #B may fail to receive all the transmission frames sent by the device #A, that is, a frame is lost. In a conventional technology, in this case, the device #B cannot accurately recover clock information from a received transmission frame, and therefore cannot accurately obtain service data from the transmission frame. In contrast, in this application, the device #B may accurately recover clock information from a received transmission frame based on information #A in the transmission frame, and accurately obtain service data from the transmission frame.

Specifically, as shown in FIG. 3, in S340, the device #B may determine a lost transmission frame in the plurality of transmission frames.

For example, the device #B may determine a lost sequence number based on information #B carried in each of received transmission frames, and determine a transmission frame with the lost sequence number as a lost transmission frame.

For ease of understanding and description, assuming that a transmission frame #C is lost, and the transmission frame #C is a $(j-d)^{th}$ frame in the plurality of transmission frames generated by the device #A in S320, the device #B may perform processing in the following manner.

The device #B may obtain a transmission frame with a smallest sequence number (denoted as a transmission frame #D) from received transmission frames whose sequence numbers are greater than a sequence number of the transmission frame #C, that is, the transmission frame #D is a transmission frame that is received by the device #B and that has a smallest sequence number in transmission frames sent by the device #A after the transmission frame #C.

Assuming that the transmission frame #D is a $j^{th}$ frame in the plurality of transmission frames generated by the device #A in S320, it indicates that the $(j-d)^{th}$ frame, a $(j-d+1)^{th}$ frame, . . . , and a $(j-1)^{th}$ frame are lost.

If d≤t, the device #B may determine, based on information #A carried in the transmission frame #D, an amount of data of the service that is carried in each of the $(j-d)^{th}$ frame, the $(j-d+1)^{th}$ frame, . . . , and the $(j-1)^{th}$ frame.

It is assumed that the device #B determines that Y transmission frames are received and X transmission frames are lost in a time period #A (that is, an example of a first time unit).

In addition, assuming that the device #B can determine, based on information #A, an amount of data of the service that is carried in each of the X lost transmission frames, the device #B may determine an amount of data (denoted as a data amount #X) of the service that is lost in the time period #A.

In addition, the device #B may determine an amount of data of the service that is carried in each of the Y transmission frames. For example, the device #B may parse a payload part of each of the Y transmission frames, to determine the amount of data of the service that is carried in each of the Y transmission frames. Alternatively, when the transmission frame carries the information #C, the device #B may determine, based on the information #C of each of the Y transmission frames, the amount of data of the service that is carried in each of the Y transmission frames. Then, the device #B may determine an amount of data (dedicated as a data amount #Y) of the service that is received in the time period #A. In this case, the device #B may determine a bandwidth (or a transmission rate) v of the service in the time period #A.

That is, v=(x+y)/t.

x represents the data amount #X, y represents the data amount #Y, and t represents a duration of the time period #A.

Then, the device #B may determine clock information of the service based on a value of v. For example, the device #B may determine clock information z based on a bit width w and the transmission rate v. That is, z=v/w.

The bit width w indicates an amount of data that can be processed at a time when the device #B recovers service data from a transmission frame.

It should be understood that the foregoing enumerated process of determining the clock information based on the transmission rate is merely an example for description, and this application is not limited thereto. The process may be similar to that in a conventional technology. To avoid repetition, detailed descriptions thereof are omitted herein.

It should be noted that, as described above, if d≤t, the device #B may determine, based on the information #A carried in the transmission frame #D, the amount of data of the service that is carried in each of the $(j-d)^{th}$ frame, the $(j-d+1)^{th}$ frame, . . . , and the $(j-1)^{th}$ frame.

However, if d>t, the device #B still cannot determine an amount of data of the service that is carried in some (d-t) lost transmission frames. That is, when a quantity of consecutively lost transmission frames is relatively large due to a relatively large bit error rate of a transmission channel between the device #A and the device #B, the device #B cannot determine an amount of data of the service that is carried in each lost transmission frame.

In this case, a value of t may be increased to resolve the problem. That is, when the quantity of consecutively lost transmission frames is relatively large due to a relatively large bit error rate of the transmission channel between the device #A and the device #B, the value of t may be increased.

When the quantity of consecutively lost transmission frames is relatively small due to a relatively small bit error rate of the transmission channel between the device #A and the device #B, the value of t may be reduced.

Figure 7:
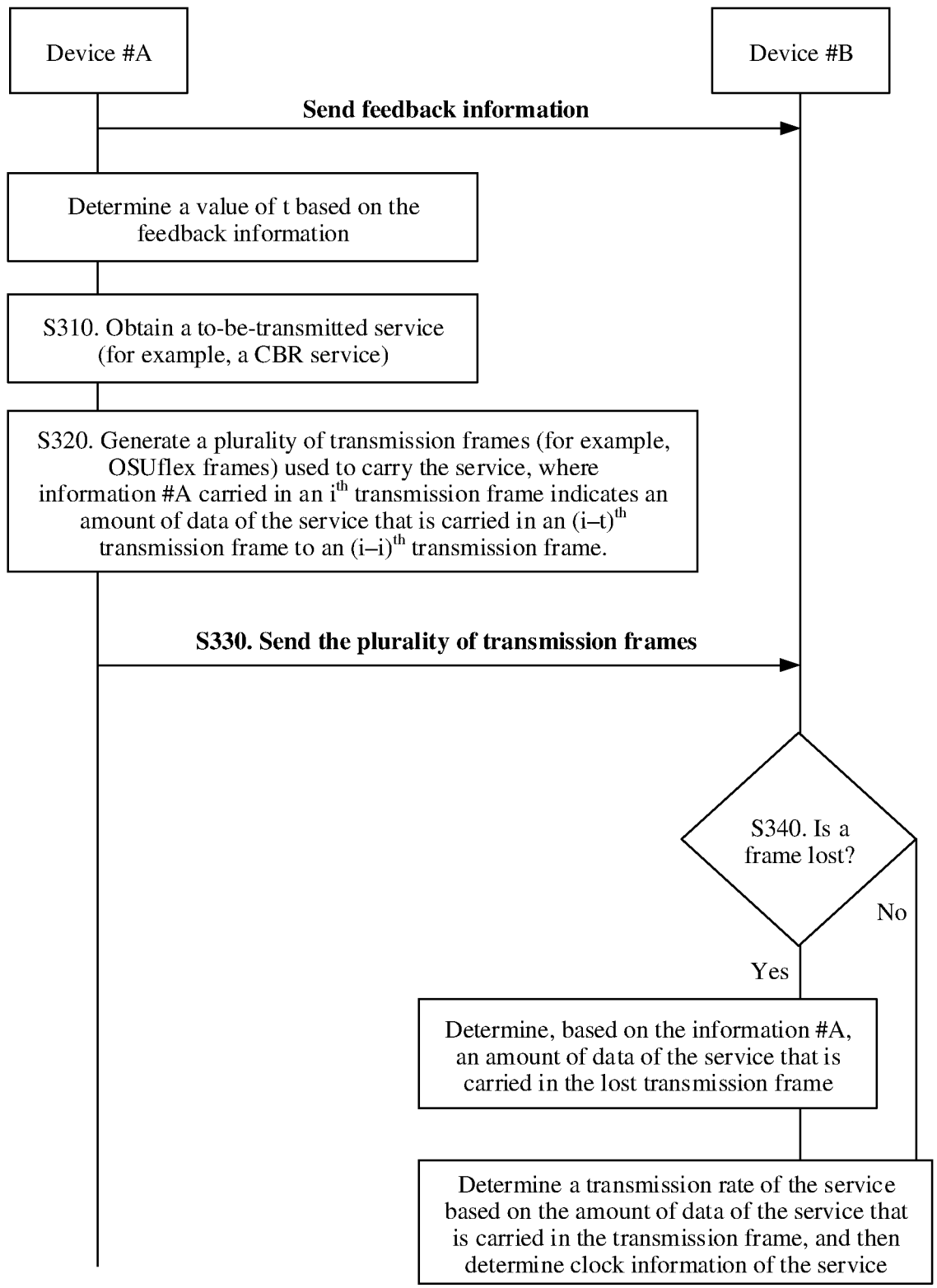
FIG. 7 is a schematic interaction diagram of another example of a service processing method according to this application.

FIG. 7 is a schematic interaction diagram of another example of a service processing method according to this application. Different from the method shown in FIG. 3, in the method shown in FIG. 7, the device #B may further send feedback information to the device #A. The feedback information may be used to indicate a bit error rate or a packet loss rate of the device #B within a specified time period. Therefore, the device #A may adjust the value of t based on the feedback information.

It should be noted that, the feedback manner shown in FIG. 7 is merely an example in which the device #A learns the bit error rate of the transmission channel between the device #A and the device #B, and this application is not limited thereto. For example, the bit error rate of the transmission channel between the device #A and the device #B may alternatively be determined by using a prior model or an online test manner, and information about the bit error rate is input to the device #A.

Figure 8:
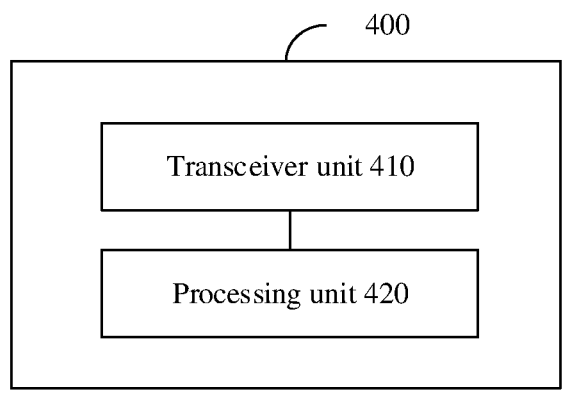
FIG. 8 is a schematic diagram of an example of a service processing apparatus according to this application.

FIG. 8 is a schematic block diagram of a service processing apparatus 400 according to an embodiment of this application. The apparatus 400 includes a transceiver unit 410 and a processing unit 420. The transceiver unit 410 may communicate with outside. The processing unit 420 is configured to perform service processing. The transceiver unit 410 may also be referred to as a communication interface or a communication unit.

Optionally, the apparatus 400 may further include a storage unit. The storage unit may be configured to store instructions and/or data. The processing unit 420 may read the instructions and/or data in the storage unit.

In an implementation, the apparatus 400 may be configured to perform an action performed by the transmitting device in the foregoing method embodiment. In this case, the apparatus 400 may be a communication device or a component that may be configured in the communication device. The transceiver unit 410 is configured to perform a receiving or sending related operation of the transmitting device in the foregoing method embodiment. The processing unit 420 is configured to perform a processing related operation on the transmitting device side in the foregoing method embodiment.

In another implementation, the apparatus 400 may be configured to perform an action performed by the receiving device in the foregoing method embodiment. In this case, the apparatus 400 may be a communication device or a component that may be configured in the communication device. The transceiver unit 410 is configured to perform a receiving or sending related operation of the receiving device in the foregoing method embodiment. The processing unit 420 is configured to perform a processing related operation on the receiving device side in the foregoing method embodiment.

Figure 9:
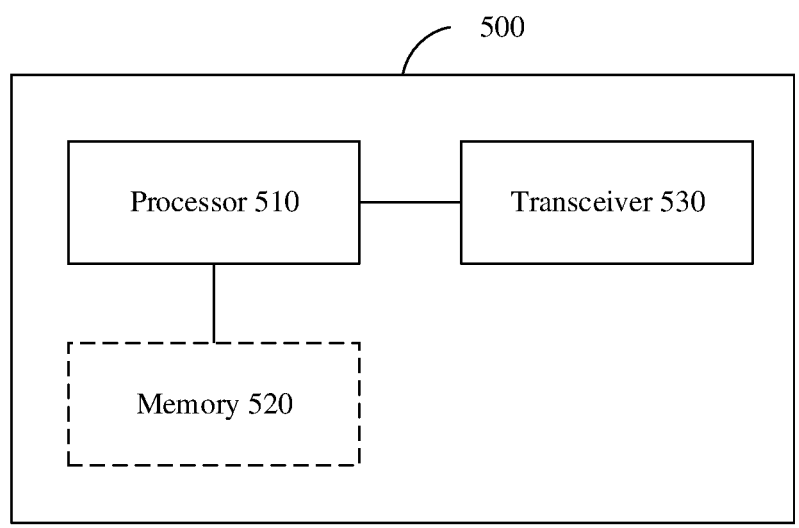
FIG. 9 is a schematic diagram of another example of a service processing apparatus according to this application.

As shown in FIG. 9, an embodiment of this application further provides a service processing device 500. The device 500 includes a processor 510. The processor 510 is coupled to a memory 520. The memory 520 is configured to store a computer program or instructions and/or data. The processor 510 is configured to execute the computer program or instructions and/or data stored in the memory 520, so that the method in the foregoing method embodiment is performed.

Optionally, the service processing apparatus 500 includes one or more processors 510.

Optionally, as shown in FIG. 9, the communication apparatus 500 may further include the memory 520. Specifically, there may be one or more memories 520. Optionally, the memory 520 and the processor 510 may be integrated, or disposed separately.

As shown in FIG. 9, the wireless communication apparatus 500 may further include a transceiver 530, and the transceiver 530 is configured to receive and/or send a signal. For example, the processor 510 is configured to control the transceiver 530 to receive and/or send the signal.

In a solution, the communication apparatus 500 is configured to implement an operation performed by the receiving device in the foregoing method embodiment. For example, the processor 510 is configured to implement a service processing related operation performed by the receiving device in the foregoing method embodiment, and the transceiver 530 is configured to implement a receiving or sending related operation performed by the receiving device in the foregoing method embodiment.

In another solution, the communication apparatus 500 is configured to implement an operation performed by the transmitting device in the foregoing method embodiment. For example, the processor 510 is configured to implement a service processing related operation performed by the transmitting device in the foregoing method embodiment, and the transceiver 530 is configured to implement a receiving or sending related operation performed by the transmitting device in the foregoing method embodiment.

In an example, the transmitting device or the receiving device in the foregoing embodiment may include an OTN device.

For explanations of related content and beneficial effects in any service processing apparatus provided above, refer to a corresponding method embodiment provided above. Details are not described herein again.

In the embodiments of this application, a specific structure of an entity for performing the method provided in the embodiments of this application is not particularly limited, provided that the entity can run a program recording code of the method in the embodiments of this application, to perform communication according to the method provided in the embodiments of this application. For example, the method provided in the embodiments of this application may be performed by a terminal device, a satellite, or a functional module that is in a terminal device or a satellite and that can invoke and execute the program.

Aspects or features in embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD)), a digital versatile disc (DVD), a smart card and a flash memory component (for example, erasable programmable read-only memory (EPROM), a card, a stick, or a key drive).

Various storage media described in this specification may represent one or more devices and/or other machine-readable media for storing information. The term "machine-readable media" may include but is not limited to: a radio channel, and various other media that can store, include, and/or carry instructions and/or data.

It should be understood that, the processor in this embodiment of this application may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or any conventional processor or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor. It should be further noted that the memory described in this specification is intended to include, but is not limited to, these memories and any other appropriate type of memories.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided embodiments of this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application. Therefore, the protection scope of this application shall be subject to the protection scope of the claims.

What is claimed is:

1. A method, comprising:
    generating, by a first device, a plurality of transmission frames, wherein an $i^{th}$ frame in the plurality of transmission frames carries first information, the first information indicates an amount of data of a service that is carried in each frame of t transmission frames, the t transmission frames comprise an $(i-t)^{th}$ frame to an $(i-1)^{th}$ frame in the plurality of transmission frames, i and t are integers, i−t>0, and t≥1, and wherein the $i^{th}$ frame further carries third information, and the third information indicates an amount of data of the service that is carried in the $i^{th}$ frame; and
    sending, by the first device, the plurality of transmission frames to a second device.

2. The method according to claim 1, wherein the first information comprises t pieces of sub-information, the t pieces of sub-information are in a one-to-one correspondence with the t transmission frames, and each piece of the t pieces of sub-information indicates the amount of data of the service that is carried in a corresponding transmission frame of the t transmission frames.

3. The method according to claim 1, wherein the first information comprises t bits, the t bits are in a one-to-one correspondence with the t transmission frames, and a value of each bit of the t bits corresponds to the amount of data of the service that is carried in a corresponding transmission frame of the t transmission frames.

4. The method according to claim 1, wherein the first information is carried in an overhead part of the $i^{th}$ frame.

5. The method according to claim 1, wherein a value of t is based on a bit error rate of a transmission channel between the first device and the second device.

6. The method according to claim 1, wherein t is equal to 1, 2, or 3.

7. The method according to claim 1, wherein the $i^{th}$ frame further carries second information, and the second information indicates a sequence number of the $i^{th}$ frame in the plurality of transmission frames.

8. The method according to claim 1, wherein the service comprises a constant bit rate (CBR) service.

9. The method according to claim 1, wherein the plurality of transmission frames comprises at least one flexible optical service unit (OSUflex) frame.

10. A method comprising:
    receiving, by a second device, at least one transmission frame, wherein the at least one transmission frame belongs to a plurality of transmission frames sent by a first device, an $i^{th}$ frame in the plurality of transmission frames and in the received at least one transmission frame carries first information, the first information indicates an amount of data of a service that is carried in each frame of t transmission frames, the t transmission frames comprise an $(i-t)^{th}$ frame to an $(i-1)^{th}$ frame in the plurality of transmission frames, i and t are integers, i−t>0, and t≥1, and wherein the $i^{th}$ frame carries further third information, and the third information indicates an amount of data of the service that is carried in the $i^{th}$ frame; and
    determining, by the second device based on the first information, clock information of the service carried in the at least one transmission frame.

11. The method according to claim 10, wherein the $i^{th}$ frame is a transmission frame received by the second device in a first time period, and
  determining, by the second device based on the first information, the clock information of the service carried in the at least one transmission frame comprises:
  when a transmission frame of the plurality of transmission frames is lost in the first time period, determining, by the second device based on the first information carried in the $i^{th}$ frame, a transmission rate of the service sent by the first device in the first time period; and
  determining, by the second device based on the transmission rate, the clock information of the service carried in the at least one transmission frame received in the first time period.

12. The method according to claim 10, wherein the first information comprises t pieces of sub-information, the t pieces of sub-information are in a one-to-one correspondence with the t transmission frames, and each piece of the t pieces of sub-information indicates the amount of data of the service that is carried in a corresponding transmission frame of the t transmission frames.

13. The method according to claim 10, wherein the first information comprises t bits, the t bits are in a one-to-one correspondence with the t transmission frames, and a value of each bit of the t bits corresponds to the amount of data of the service that is carried in a corresponding transmission frame of the t transmission frames.

14. The method according to claim 10, wherein the first information is carried in an overhead part of the $i^{th}$ frame.

15. The method according to claim 10, wherein t is equal to 1, 2, or 3.

16. The method according to claim 10, wherein the $i^{th}$ frame further carries second information, and the second information indicates a sequence number of the $i^{th}$ frame in the plurality of transmission frames.

17. A communication apparatus, comprising:
  at least one processor, configured to:
    generate a plurality of transmission frames, wherein an $i^{th}$ frame in the plurality of transmission frames carries first information, the first information indicates an amount of data of a service that is carried in each frame of t transmission frames, the t transmission frames comprise an $(i-t)^{th}$ frame to an $(i-1)^{th}$ frame in the plurality of transmission frames, i and t are integers, i-t>0, and t≥1, and wherein the $i^{th}$ frame further carries third information, and the third information indicates an amount of data of the service that is carried in the $i^{th}$ frame; and
    send the plurality of transmission frames to a transceiver; and
  the transceiver, configured to:
    send the plurality of transmission frames received from the at least one processor.

18. The communication apparatus according to claim 17, wherein the first information comprises t pieces of sub-information, the t pieces of sub-information are in a one-to-one correspondence with the t transmission frames, and each piece of the t pieces of sub-information indicates the amount of data of the service that is carried in a corresponding transmission frame of the t transmission frames.

19. The communication apparatus according to claim 17, the first information comprises t bits, the t bits are in a one-to-one correspondence with the t transmission frames, and a value of each of the t bits corresponds to an amount of data of the service that is carried in a corresponding transmission frame.

20. The communication apparatus according to claim 17, wherein the first information is carried in an overhead part of the $i^{th}$ frame.

* * * * *